US010125637B2

(12) United States Patent
Mächler (10) Patent No.: US 10,125,637 B2
(45) Date of Patent: Nov. 13, 2018

(54) THERMAL POWER PLANT WITH HEAT RECOVERY

(71) Applicant: Josef Mächler, Bern (CH)

(72) Inventor: Josef Mächler, Bern (CH)

( * ) Notice: Subject to any disclaimer, the term of this patent is extended or adjusted under 35 U.S.C. 154(b) by 267 days.

(21) Appl. No.: 15/106,730

(22) PCT Filed: Dec. 10, 2014

(86) PCT No.: PCT/EP2014/077157
§ 371 (c)(1),
(2) Date: Jun. 20, 2016

(87) PCT Pub. No.: WO2015/091135
PCT Pub. Date: Jun. 25, 2015

(65) Prior Publication Data
US 2017/0002691 A1    Jan. 5, 2017

(30) Foreign Application Priority Data

Dec. 20, 2013  (CH) ............................... 20130002115

(51) Int. Cl.
*F01K 11/02*  (2006.01)
*F01K 9/00*  (2006.01)
(Continued)

(52) U.S. Cl.
CPC ............... *F01K 11/02* (2013.01); *F01K 9/00* (2013.01); *F01K 11/00* (2013.01); *F01K 17/005* (2013.01); *Y02E 20/14* (2013.01)

(58) Field of Classification Search
CPC ........ F01K 11/00; F01K 11/02; F01K 17/005; F01K 9/00; Y02E 20/14
See application file for complete search history.

(56) References Cited

U.S. PATENT DOCUMENTS 4,733,536 A *  3/1988  DiBella ................. F01K 23/065
                                                    417/309
9,038,389 B2 *  5/2015  Palmer .................... F01K 9/003
                                                    60/651

(Continued)

FOREIGN PATENT DOCUMENTS

CH       709010 A1    6/2015
DE     3327838 A1   12/1983
(Continued)

OTHER PUBLICATIONS

World Intellectual Property Organization, International Search Report for International Application No. PCT/EP2014/077157, dated Mar. 6, 2015, 3 total pages.

*Primary Examiner* — Phutthiwat Wongwian
*Assistant Examiner* — Matthew T Largi
(74) *Attorney, Agent, or Firm* — SoCal IP Law Group LLP; Mark Andrew Goldstein; William J. Campbell (57) ABSTRACT

In an energy conversion method and a thermal power plant for converting heat into mechanical or electric energy using a working medium, a vapor state in the working medium is generated at a first pressure in a steam generator. The vaporized working medium is expanded to a lower second pressure in a steam expanding device. An energy obtained by the expansion process is discharged. The expansion of the steam state is carried out using a saturation line of the working medium. The working medium is thereby separated into a non-condensed portion and a condensed portion in a separating device. The non-condensed portion is then compressed into a compressed non-condensed portion in a compressor. The compressed non-condensed portion is cooled and condensed into a compressed condensed portion. The compressed condensed portion and the initially con- (Continued)

densed portion are then heated, and both portions are returned to the steam generator together.

16 Claims, 8 Drawing Sheets

(51) Int. Cl.
  *F01K 11/00* (2006.01)
  *F01K 17/00* (2006.01)

(56) References Cited

U.S. PATENT DOCUMENTS

| | | | |
|---|---|---|---|
| 2002/0162330 A1* | 11/2002 | Shimizu | F01K 25/06 60/651 |
| 2004/0182082 A1 | 9/2004 | Saranchuk et al. | |
| 2005/0144948 A1* | 7/2005 | Negre | F01B 17/02 60/645 |

FOREIGN PATENT DOCUMENTS

| | | |
|---|---|---|
| DE | 102010034153 A1 | 2/2012 |
| WO | 2008009681 A1 | 1/2008 |
| WO | 2014018654 A1 | 1/2014 |
| WO | 2015/091135 A1 | 6/2015 |

\* cited by examiner

THERMAL POWER PLANT WITH HEAT RECOVERY

RELATED APPLICATION INFORMATION

This patent claims priority from International PCT Patent Application No. PCT/EP2014/077157 filed Dec. 10, 2014 entitled, "THERMAL POWER PLANT WITH HEAT RECOVERY, AND ENERGY CONVERSION METHOD USING SUCH A THERMAL POWER PLANT", which claims priority to Swiss application no. 20130002115 filed Dec. 20, 2013 entitled, "THERMAL POWER PLANT WITH HEAT RECOVERY, AND ENERGY CONVERSION METHOD USING SUCH A THERMAL POWER PLANT", all of which are incorporated herein by reference in their entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

The invention relates to the field of plants for generation of mechanical or electrical energy from heat, in particular of thermal power plants with heat recovery, above all thermal engines, piston steam engines or steam turbines

STATE OF THE ART

Known from the state of the art are various steam cycle processes with a recovery of energy yielded in the process. A generation of electrical energy by means of steam power plants is, as a rule, based on a Clausius-Rankine cycle process. This method has two drawbacks. On the one hand, the steam has to be condensed after expansion in the steam turbines, which takes place in cooling towers or by means of river water cooling. A very large amount of heat, about 60%, is thereby lost. Besides the loss of heat, the environment is thereby also impacted with waste heat, which is likewise undesired. On the other hand, the low pressure component is linked to the ambient temperature. To achieve a sufficient degree of efficiency, high temperatures of about 600 to 800° C. must be used on the high pressure side. This means however that only heat at high temperature can be converted into electrical energy. Geothermal heat, solar heat or heat in the form of heat recovery cannot be converted into electrical energy in an economical way with the Rankine cycle process.

Known from DE 3427219 is e.g. a steam engine cycle for gas turbines or piston steam engines which works with a supercritical range of a working material. A hot or cold gas of a working material is obtained in supercritical temperature range and pressure range directly from the liquid phase, and is further heated at constant supercritical pressure, and is fed to a gas turbine. In the gas turbine, the gas is expanded adiabatically or polytropically up to near the critical point of the working material. A further cooling of the gas down to its complete liquefaction is undertaken by means of a heat pump and/or expansion chamber. The further cooling takes place at or below the critical temperature, but still above the critical pressure. All the heat absorbed from outside by the supercritical steam engine cycle, i.e. the liquefaction heat and superheating heat as well as the heat absorbed via the turbine walls during expansion in the case of operation with cold steam can be converted into work.

WO 2012/049259 A1 shows a method and a facility for conversion of an external heat source with comparably low temperature with a Clausius-Rankine cycle process. In the method, a medium in the liquid phase is compressed using an external power source to obtain a fluid medium. The compressed, fluid medium is heated by heat coming at least partially from the external heat source. The medium is thereby expanded, and is brought into the supercritical phase. Then the pressure of the heated medium is reduced to a predetermined value, and, to be precise, through expenditure of work, to generate electrical energy. The frequency of the energy is converted to a desired output frequency, and temperature and volume of the medium are reduced, in order to bring the medium into the liquid phase and to lead it back into the cycle. A multiplicity of heat exchangers are provided between the liquid medium and the expanded steam. This method is not suitable for the use of geothermal heat and solar heat owing to the required temperature ranges.

OBJECT OF THE INVENTION

It is an object of a thermal power plant according to the present invention, in particular thermal engines, to avoid sources of heat loss, to lower the temperature required for the cycle processes used, and to improve the degree of efficiency of the plant, in particular to increase the conversion into electrical energy.

This object is achieved by a thermal power plant according to claim 1 and a method of energy generation according to claim 10. Advantageous embodiments and further embodiment examples are described in the dependent claims.

An energy conversion method for converting heat into mechanical or electrical energy by means of a working medium according to the present invention has the following steps. A vapor state in the working medium is generated at a first pressure in a steam generator. The evaporated working medium is expanded to a lower second pressure in a steam expanding device. Energy obtained by the expansion process is discharged, for example to a generator. Used for transmission is a transmission, such as e.g. a hydraulic transmission. According to the invention the expansion of the steam state is carried out using a saturation line of the working medium. The working medium is thereby separated into a non-condensed portion and a condensed portion in a separating device. The non-condensed portion is then compressed into a compressed non-condensed portion in a compressor. The compressed non-condensed portion is cooled and condensed into a compressed condensed portion. The compressed condensed portion and the initially condensed portion are then heated, and the portions are returned to the steam generator together.

A thermal power plant for converting energy by means of a working medium for carrying out the method according to the invention has a steam generator for vaporizing the working medium at a first pressure, a steam expanding device for expanding the working medium present in the vapor state to a lower, second pressure, a condenser and a condensate pump. Used as heat source for the working medium can be heat from combustion, geothermal energy, solar systems, waste heat from cooling systems and/or from heat recovery. The condenser cools and liquefies the working medium discharged out of the steam expanding device. The steam expanding device is set up in such a way that a working medium expanded by the steam expanding device has a condensed portion and a non-condensed portion. The expansion proceeds according to the invention substantially through a polytrope of the working medium, preferably through a saturation line, in particular its critical point. Furthermore a separation device for separation of the condensed portion and of the non-condensed portion and a compressor for compression of the non-condensed portion of the working medium are provided. The non-condensed portion of the expanded working medium is thereby condensed at least partially by means of the condensed portion in the condenser.

With the method according to the invention, heat of lower temperature, such as that from wood burning, geothermal sources, heat recovery, can also be converted into electrical energy with a good degree of efficiency.

The expansion of the working medium vaporized in the steam generator takes place preferably through a wet steam expansion, and the cooling and condensing of the compressed, non-condensed portion takes place preferably by means of the condensed portion. The second pressure for the expansion phase is advantageously determined with a compressibility factor Z for the working medium at the critical point. With the method the non-condensed portion can amount to 50% to 60% of the vaporized working medium. Accordingly the initially condensed portion is 40% to 50%.

In an embodiment of the thermal power plant according to the invention, the separation device can comprise a housing, whereby provided in an upper region of the housing is the compressor, in a lower region of the housing is the steam expanding device, and in a bottom region under the lower region is a pump for pumping out the one condensed portion.

The phase separation can take place e.g. according to the centrifuge principle in a turbine. The shape of the blades of the turbine are advantageously adapted for this purpose so that the vaporized working medium is separated and the portions can be discharged out of the turbine via a condensate connection and a residual steam suction line.

In an embodiment of the thermal power plant according to the invention, the steam expanding device can comprise working cylinders with inlet valves, for admitting the vaporized working medium, and pistons which follow the working cylinders. Preferably two working cylinders each are disposed opposite on the separation device. This means that the working cylinders are disposed symmetrically in an opposing way and are connected to the same piston.

The thermal power plant preferably has a swinging arm mechanism with at least one swinging arm. The swinging arm mechanism is coupled to the compressor for compression of the non-condensed portion of the working medium and to a pump for discharging the condensed portion out of the separation device. Preferably the swinging arm mechanism can be accommodated in the housing of the separation device. The swinging arm mechanism can drive the working cylinders and pistons of the swinging arm mechanism. A swinging arm can be coupled to the piston of the steam expanding device and to a piston of the residual steam compressor and be disposed in a way rotating around a lever shaft. The swinging arm is preferably also coupled to a crank mechanism and transmits expansion work of the working medium from the working cylinders to the crank mechanism. The crank mechanism can pass the work further on to a generator.

In a preferred embodiment of the thermal power plant according to the invention, the pistons have outlet valves, which are built into the piston and are controllable by a switchover pin. The switchover pin is guided, for example, with the aid of a guiding piece for the piston and a coupling to the swinging arm mechanism. With expansion of the working medium, an outlet valve on the one side can be closed while an outlet valve on the other side is open and the expanded steam can be expelled.

Furthermore in an embodiment of the thermal power plant according to the invention, the compressor can comprise compressor inlet valves and compressor pistons. A compressor inlet valve is thereby disposed in the compressor piston and is controllable by means of a piston rod. The piston rod is preferably coupled to the swinging arm mechanism. The compression of the non-condensed portion is thereby linked to the expansion of the vaporized working medium.

Expansion Process

According to the state of the art, assumed with thermal engines is a Carnot cycle process according to the theory of the ideal gas with two adiabatic curves and two isothermal curves. The method and the thermal power plant according to the invention however include above and beyond this the intermolecular attraction of the molecules, as will be explained in the following, whereby an improved degree of efficiency of the plant can be achieved.

With this method according to the invention a considerable loss factor of conventional plants is eliminated. The cooling towers are replaced, and the method thereby becomes more economical. The efficiency is considerably improved, and the environment is less impacted by waste heat. There is no dependence on the ambient temperature, and the process temperature is lowered. The method and the plant are also suitable for heat of lower temperature such as geothermal heat, that from wood burning, from heat recovery, and the energy conversion into mechanical, respectively electrical, energy takes place with a good level of efficiency.

With the thermal power plant improvements are achieved, and to be precise:

in terms of the degree of efficiency, i.e. mechanical or electrical energy delivered by the plant in relation to thermal energy brought into the machine;

in terms of application possibilities for the thermal power plant also at low absolute temperature of the heat source, such as e.g. with solar heat, geothermal energy, wood burning, heat recovery, etc.; and in terms of effects on the environment, since there results no appreciable waste heat released into the environment, no cooling towers are necessary, etc.

This is achieved in that, in a thermal power plant, in a modification of the conventional Rankine cycle process, with the method according to the invention, a working medium is brought initially into a supercritical state through heat supplied from outside. The supercritical working medium is then expanded through the critical point of the working medium with carrying out of mechanical work. Then the resulting gas/liquid phase mixture, that is the non-condensed portion and the condensed portion (residual steam/condensate) is separated. The residual steam portion is at first compressed and thereby heated, and is then brought into heat exchange with the non-heated and thus colder condensate portion, so that the residual steam portion is then liquefied.

The thermal power plant contains a steam generator, in which the working medium, according to this step, is brought into a supercritical state through addition of heat, a steam expanding device for expansion of the working medium, e.g. in the form of the working cylinder, as indicated above, or a turbine or the like. In the steam expanding device the supercritical working medium carries out work during the expansion. Further provided is a compressor for the residual steam as well as a separation device, which is in fluid connection with the steam expanding device and the residual steam compressor. The separation device has an upper, a lower and a bottom region, whereby the condensate portion collects in the bottom region and the non-condensed residual steam portion collects in the lower to upper region. The lower region of the separation device can be brought into fluid connection with the steam expanding device, and the upper region can be brought into fluid connection with the residual steam compressor. After the expansion of the supercritical working medium in the steam expanding device, this medium exits the steam expanding device and arrives in the separation device, in which the condensate portion collects in the bottom region and above that the residual steam portion collects. The bottom region of the phase separator is in fluid connection with a pump, in order to pump the condensate portion back to the steam generator. In the residual steam compressor the residual steam portion is compressed and thereby heated. The compressed and heated residual steam is (a) brought into heat exchange with the condensate in a heat exchanger/condenser or is respectively in particular (b) mixed with the condensate, whereby the residual steam is thereby likewise condensed.

As explained above, the steam expanding device has e.g. at least one cylinder/piston unit, in particular in a boxer or horizontally opposed configuration, and can be coupled to a generator. A first part of the mechanical work performed by the supercritical working medium at the steam expanding device is thereby conveyed to the generator in order to generate electrical energy. The steam expanding device and the residual steam compressor are likewise coupled to one another, e.g. via a swinging arm mechanism with corresponding arrangement of rods, as mentioned above. A second part of the mechanical work performed by the supercritical working medium at the steam expanding device is thereby used at the residual steam compressor in order to compress and heat the residual steam portion.

Unlike in the case of cogeneration, in which chemical energy is converted predominantly into electrical and caloric energy as waste heat exploited in a targeted way, with the invention the energy coming from a heat source, e.g. solar heat, geothermal energy, etc. can be used in such a way that in the end predominantly mechanical or electrical energy and practically no caloric energy, i.e. no appreciable waste heat, is produced.

As working medium, besides air, other substances are possible, such as water, fluorocarbons, chlorinated hydrocarbons, alkanes, etc., in particular also nitrogen or mixtures. Owing to the low critical point, i.e. a low critical temperature and critical pressure, of nitrogen, oxygen and argon and their minimal price as air mixture, air is preferred as the working medium. Heat sources with relatively low absolute temperature, such as solar heat, geothermal energy, etc. can thereby be also exploited with practically complete conversion into mechanical or electrical energy.

BRIEF DESCRIPTION OF THE DRAWINGS

The way the method works and one embodiment according to the invention are presented in the following with reference to the drawings, which serve merely explanatory purposes and are not to be interpreted in a limiting way. Features of the invention disclosed from the drawings should be viewed as belonging to the disclosure of the invention individually and in any combination. Shown in the drawings are.

DETAILED DESCRIPTION

Described in FIGS. 1 to 8 is the cycle process on which the method is based according to the invention for conversion of energy by means of a working medium in a thermal power plant. Presented in FIGS. 9 to 16 is a thermal power plant according to the invention which works according to the energy conversion method according to the invention.

Figure 1:
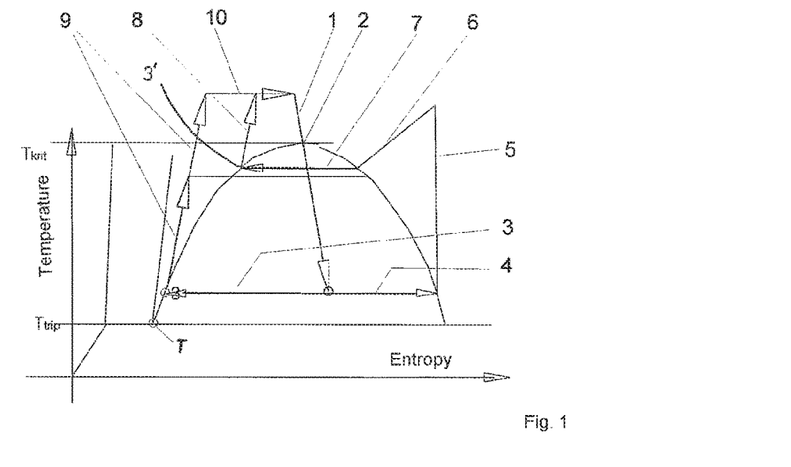
FIG. 1: A cycle process for a thermal power plant with heat recovery according to the invention.

With the supposition that thermal engines can be equipped with heat recovery, a new method is presented as shown in FIG. 1. This method is characterized primarily in that steam is expanded through the polytrope, preferably through the saturation line and especially preferably through the critical point 2. With this expansion 1 there results a mixed phase, consisting of a non-condensed portion, the steam 3, and a condensed portion, the condensate 4. Seen isentropically, there arises with the expansion 1 through the critical point, for example with air, about 48% steam phase and 52% condensate.

Made use of for the method according to the invention is that, with expansion in the steam phase, the working medium can condense. This is caused by a condensation owing to the dipolarity of the steam molecules, which is the basis for a loose bridge bonding, on which the liquid phase of the working medium is based. The bridge bonding occurs when the inner energy of two steam molecules, which collide, is less than a bonding energy of the dipole. At the critical point, steam phase and liquid phase exist in thermal equilibrium. Thus at the critical point the sum of the inner energy of the molecules, whose inner energy is higher than the bonding energy of the dipole, is in phase equilibrium with the steam molecules whose inner energy is lesser than that of the dipole.

Figure 2:
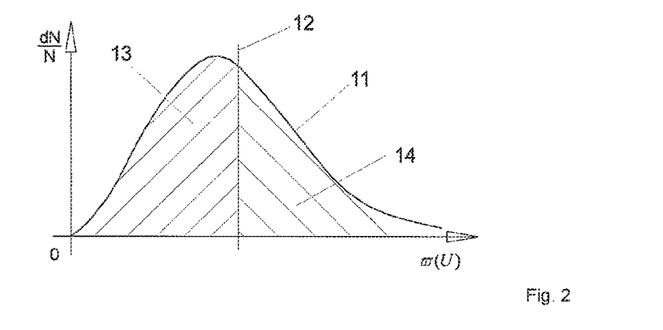
FIG. 2: The Maxwell distribution of the cycle process according to FIG. 1 at the critical point.

Shown in FIG. 2 is the Maxwell distribution 11 of the molecules for the critical point. Since the inner energy is a quadratic function of the molecular velocity, the bonding energy is indicated at the quadratic mean 12. The area under the curve corresponds to the portion of the molecules at the respective molecular velocity. The area 13 on one side of the quadratic mean 12 corresponds approximately to the area 14 on the other side of the quadratic mean 12. In this state no lasting bridge bonding can arise because this bridge bonding is destroyed again and again by the faster molecules.

Figure 3:
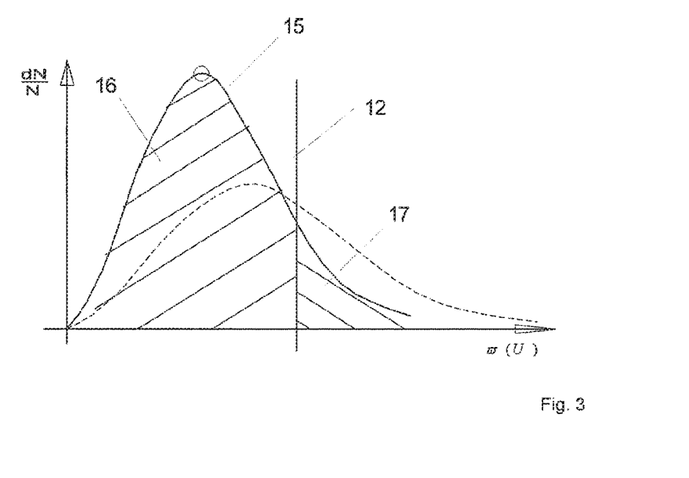
FIG. 3: The Maxwell distribution of the cycle process according to FIG. 1 in the final state.

As a comparison, the Maxwell distribution for an end state of the working medium is shown in FIG. 3. The temperature after expansion is lower than at the beginning, whereby the distribution function according to Maxwell 15 shifts, while the binding energy 12 is assumed as constant. The number of molecules whose inner energy is lesser than that of the bridge bonding, is significantly greater. The number of molecules whose inner energy is greater than that of the bonding energy is significantly smaller. They can no longer destroy all the bridge bonds, so that condensation occurs. The number of condensed molecules results from the difference between the areas 16 and 17. The above hypothesis that with the isentropic expansion through the critical point condensation occurs is thereby confirmed. The thermal power plant according to the invention thus represents a kind of condensation motor.

However the losses must also be taken into account, such as frictional, leakage and insulation losses. The friction is transformed into heat, and this will cause a vaporization of condensate. The leakage losses will increase the suction volume of the residual gas compression. An increasing entropy thereby results. With losses of 20%, a phase mixture of about 40% condensate and 60% steam will be achieved.

The heat of condensation has its maximal value at the triple point T of the working medium. The value of the condensation heat then decreases with increasing temperature, and reaches the value zero at the critical point. Hence the principle of heat recovery by means of internal condensation according to the present invention consists in that the steam portion is heated by means of compression in such a way that it can be liquefied by means of the cold condensate portion.

Used according to the invention is a cycle process with a working medium, which consists of the following steps, as shown in FIG. 1:

Expansion 1 of the steam through the critical point 2,
Separation of the non-condensed portion, i.e. of the steam portion, 3 and of the condensed portion, i.e. of the condensate portion, 4 in a separation device,
Compression 5 of the non-condensed steam portion 3 in a condenser,
Re-cooling 6 of the compressed, non-condensed steam portion 3,
Condensing 7 of the until now non-condensed steam portion by means of the cold condensate in a condenser into a compressed portion 3',
Heating 8 of the compressed, condensed portion 3',
Heating 9 and if necessary pumping of the already initially condensed portion, and
Vaporization 10 of the entire condensate consisting of compressed, condensed steam portion 3' and initially condensed condensate portion 4.

The invention makes use of the effect of wet steam expansion. If the pressure at the critical point is determined from the critical density and the critical temperature of the working medium used according to the gas law, a pressure is obtained for air of 131 bar. Now the critical pressure with air is effectively 37.2 bar. This reduced pressure is explained by the effect of the intermolecular attractive forces, and this is determined with the compressibility factor Z, as it is defined, for example, in the VDI Heat Atlas (1984 edition, sheet Da 13).

Figure 4:
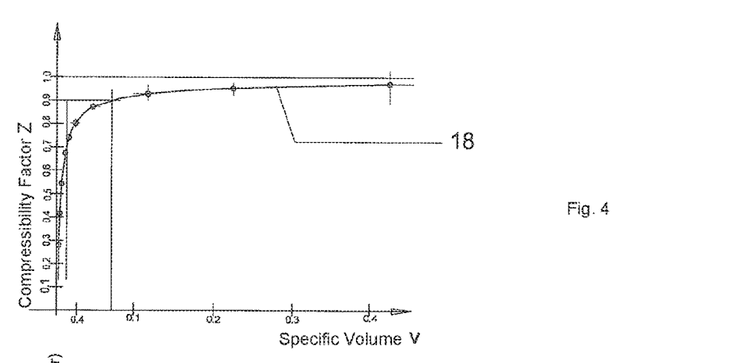
FIG. 4: The compressibility factor Z for air in the saturation state as a function of the specific volume of the cycle process according to FIG. 1.

Shown in FIG. 4 is the compressibility factor Z as a function of the specific volume v for air in the saturation state 18, on the basis of table 17; Material Values of Air in the Saturation State, VDI Heat Atlas, sheet DB 11. The intermolecular attraction has a very strong effect when the density is high and the intermolecular spacing is small. Immediately after the critical point the intermolecular attraction decreases greatly. That can lead to the decrease in the intermolecular attraction being greater than the volume increase with the expansion. In this range the pressure can remain constant or can even increase with the expansion, which is to be taken into consideration with the construction of the thermal power plant. With increasing volume the steam passes into the gas phase.

Figure 5:
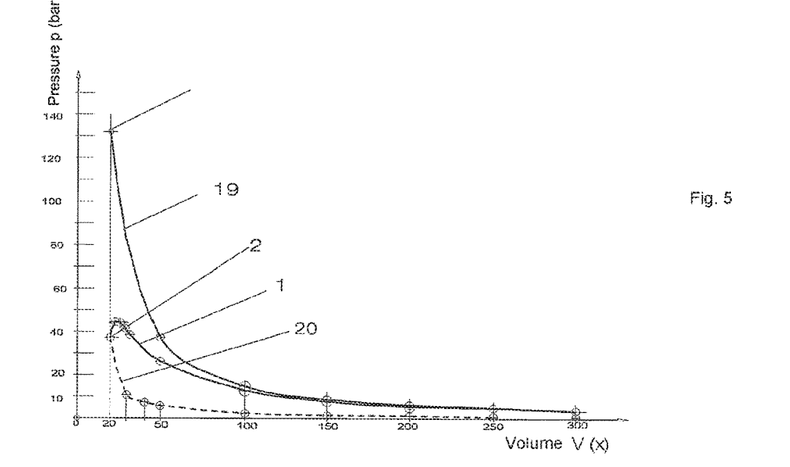
FIG. 5: Comparison of the adiabatic change of state with respect to wet steam expansion of the cycle process according to FIG. 1.

FIG. 5 shows this relationship in a pressure-volume diagram. The expansion 1, taking into account the compressibility factor Z, climbs immediately after the critical point 2, or respectively the pressure increases, but then approaches the adiabatic curve 19, which assumes a pressure of 131 bar. The pressure of 131 bar results, with the general gas law, from the critical temperature and the critical density of the working medium. This means that the greater the specific volume is, the greater the intermolecular spacing will be and the steam passes into the gas state. The adiabatic curve for pure gas expansion, determined according to the general gas law starting with the critical point, would run according to line 20. The area under the state function corresponds to the work performed. Therefore it can be seen from FIG. 5 that with the wet steam expansion with the adiabatic curve 19 more work is performed than with the pure gas expansion according to line 20, starting from the critical point.

Figure 6:
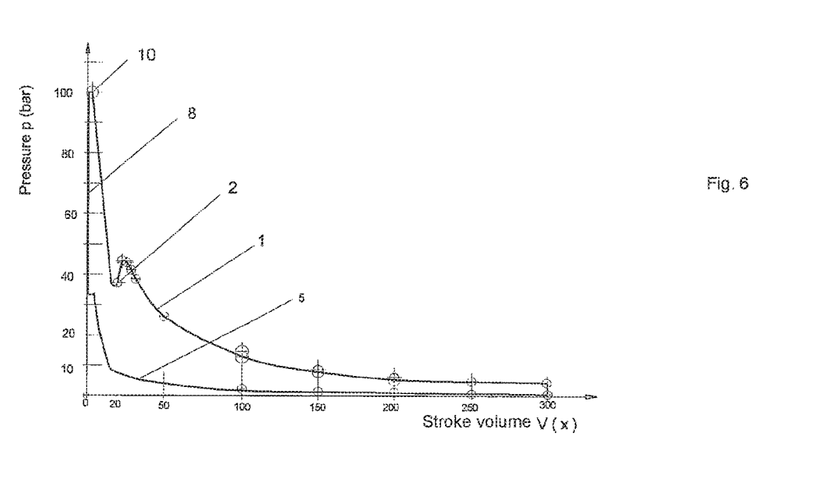
FIG. 6: A cycle process with wet steam expansion according to the invention.

Shown in FIG. 6 as pressure-volume diagram is the cycle process for the thermal power plant according to the invention, or respectively the condensation motor. The course of the wet steam expansion is again indicated by the reference numeral 1. With the compression of the residual steam, the volume is less than 60% and the state change, due to the intermolecular attraction, is flatter. This means that, due to the intermolecular attraction, the compression work is less than according to the general gas theory. Thus the work with the wet steam expansion 1 cannot be determined with the adiabatic function according to the general gas law. Since no explicit function is available for the compressibility factor Z, the stroke is calculated section-wise.

A calculation of the stroke is all the more exact, the more exactly the processes connected therewith are determined. With the method according to the invention it is assumed, for the conversion of heat into work, that this process is better explained and more precisely determined with the kinetic theory of heat than is possible with the caloric theory.

In the kinetic theory of gas, the action of force which can be generated with steam pressure is attributed to molecular collision. The mass of the atoms is thereby located for the most part in the atomic nucleus, which is very small. The atomic nucleus corresponds approximately to one hundred thousandth of the atom diameter. Around this atomic nucleus there exists a predominantly positive force field, which is generated by the positrons. Upon collision of two atoms two homopolar force fields clash. The same applies for molecules since these are composed of atoms. Molecular collisions are therefore viewed as elastic. It is assumed here that the collision of a molecule on the moving piston wall of the thermal power plant corresponds to a special case of elastic collision, namely the collision on the moving wall. The velocity of the colliding molecule accordingly changes by twice the wall velocity, respectively the piston velocity.

Figure 7:
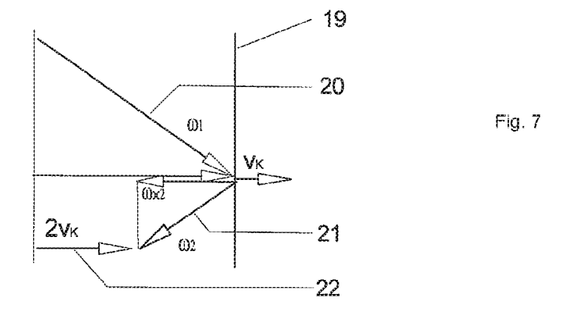
FIG. 7: Momentum vectors for the cycle process according to FIG. 6 on a moving wall.

Explained in FIG. 7 is the process of collision between the molecules. The collision process consists of two phases, the compression phase and the expansion phase. The compression phase is the phase in which the force fields hit each other. Kinetic energy is thereby converted into potential energy. The expansion phase is the phase in which the molecules repel again; the potential energy is converted back again into kinetic energy. Between the compression phase and the expansion phase lies the turning point of the collision process. It thus changes the direction and absolute value of the velocity vector, as shown in FIG. 7. Velocity and momentum are vectors; accordingly the energy balance per collision must be handled vectorially. Before the collision, a molecule hits the moving piston wall 21 with a median molecular velocity 22. After the collision, the molecule has a median velocity 23. The velocity of the molecule, respectively of its normal components, changes by twice the piston velocity (2 vK), from which a change in the inner energy and a decrease in the temperature results since the temperature is a function of the inner energy.

With the molecule collision on the wall, the molecule is slowed down from its speed, for example the median molecular velocity, to the wall speed. Through this deceleration it acts upon the wall with a mass force. With the impact on the moving wall, this mass force produces work with the shift of the wall. In the expansion phase the molecule is pushed off again, i.e. accelerated. Here too a mass force arises through the acceleration, with which mass force the molecule acts upon the wall, and here too work is produced with the shift of the wall. According to the principle of the conservation of energy, the work performed by the molecule corresponds to the change in its kinetic energy. The work transmitted to the wall per stroke is the sum of the work performed per molecular impact over the number of all molecular hits. The number of molecular hits on the wall can be calculated from the pressure by means of the second Newtonian principle. This method of calculation was checked in that the power output of the gas compressors was thereby determined. A good agreement resulted.

According to the invention, the condensation of the working medium through expansion is made use of in a thermal power plant. Condensation is the transition from the gas phase into the liquid phase. In the gas phase the molecules can move freely; they have kinetic, oscillation and rotational energy. The molecules continuously collide with each other and exchange their pulse, according to Brownian molecular motion. The portions of kinetic, oscillation and rotational energy results from the degree of freedom of movement.

The liquid phase is based on a loose dipole bond among the molecules. In this loose bridge bond the molecules can still swing and rotate; they have no kinetic energy anymore. The bridge bond can arise when the inner energy of the colliding molecules is less than the binding energy of the bridge. Molecules thus condense upon impact when their inner energy is less than the binding energy of the bridge. In order for steam to condense, inner energy must be extracted from the molecules. When hitting the moving wall, the molecules are decelerated by twice the wall velocity. This means that with this impact kinetic energy, respectively inner energy, is transferred to the pistons or, in other words, inner energy is taken away from the molecules during the expansion, so that the steam can condense.

According to the method of the present invention, a separation of the phase mixture takes place into a condensed portion and a non-condensed portion. This separation can take place by means of the principle of gravity or centrifugal force. In the case of the principle of gravity, the condensate collects as condensed portion at the bottom and can be pumped from there. The non-condensed portion in the form of residual steam can be suctioned out at the top of the separation device, such as e.g. a phase separator.

Figure 8:
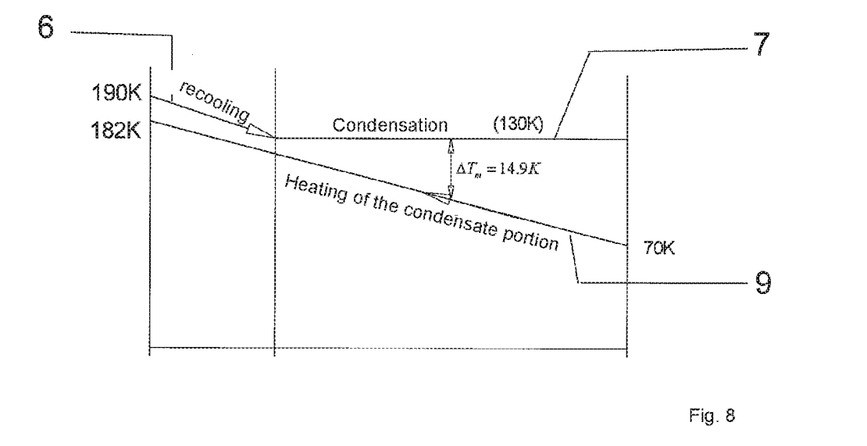
FIG. 8: Caloric design of a condenser according to the invention.

Shown in FIG. 8 is the calorific layout of the condenser: re-cooling 6 of the steam portion, condensing 7 of the steam portion on the primary side and heating 9 of the cold condensate portion in counter flow on the secondary side in the condenser. The re-cooling of 60% steam portion with 40% condensate portion is possible because the specific heat of the condensate is about twice as high as that of the steam.

The degree of efficiency of the thermal power plant can be explained as follows. The final output delivered by the plant corresponds to the difference between the work obtained with the expansion and the energy required for the compression of the residual steam portion and heating and pumping of the condensate portion. The expansion can take place, for example, from 100 to 0.1 bar, the compression of the residual steam portion from about 1 to 30 bar; the mass of the residual steam portion lies between 50-60% of the expanded steam. Thus about 30% of the work generated with the expansion passes over into the residual steam compression. The power output necessary for the pumping and heating of the condensate portion corresponds to about 2% of the work obtained with the expansion.

Air is preferably used as the working medium with the method according to the invention, on the one hand because it is environmentally safe, but also because it is a well-documented medium. In principle however other working media, such as e.g. ammonia, carbon dioxide or halogenated hydrogens can also be used. The critical point of air lies at $-141°$ C., i.e. in the low temperature range, in which air also appears as steam and liquid.

Figure 9:
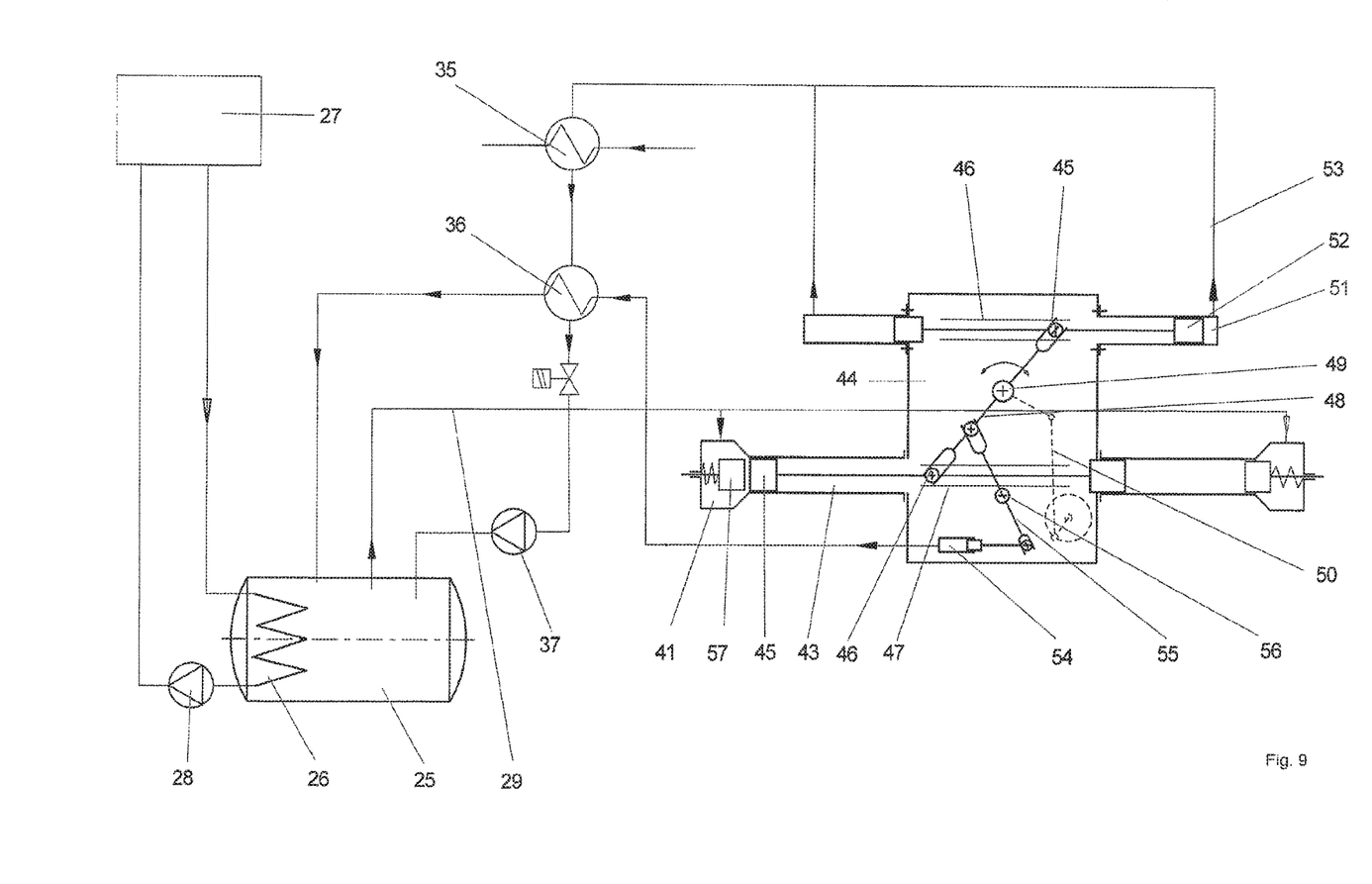
FIG. 9: A thermal power plant according to the invention with a condensation motor.

FIG. 9 shows diagrammatically a thermal power plant according to the invention with a condensation motor with heat recovery. The thermal power plant has a steam generator 25 with built-in heat input device 26. The steam generator 25 is supplied by a heat source 27. The heat source 27 can be: heat from combustion, geothermal energy, solar systems, cooling systems, heat recovery from the plant, etc. With the heat a high-pressure steam is generated in the plant and is supplied to a working cylinder 43 of the condensation motor. The machine housing 44 operates as separation device for a condensed and a non-condensed portion of the steam according to the invention, whereby the machine housing 44 represents a phase separator. Through a line 29 the high-pressure steam is led into the pressure chambers of the working cylinder 43 with cylinder heads 41 and pistons 45. The construction of the condensation motor corresponds to the so-called boxer principle, in which two cylinders 43 each are disposed in an opposed way in a machine housing 44. Built into the cylinder head 41 are also inlet valves 57 for admission of the steam.

With a piston rod e.g. via a crosshead 46, which is guided in guiding pieces 47, the pistons 45 are connected to a mechanism with swinging arm 48, to which the stroke of the piston 45 is transmitted. The swinging arm 48 sits on a swinging arm shaft 49 with which the swinging movement is transmitted outwardly to a crank mechanism 50. Driven with the crank mechanism 50 is a transmission, preferably an infinitely variable hydraulic transmission, with which a generator can then be driven. The swinging arm mechanism is coupled to a residual steam compressor 51. With the swinging arm 48, via the crosshead 46, a piston 52 is driven in cylinders of the residual steam compressor 51. The residual steam compressor 51 is connected to a pre-cooler 35 and a condenser 36. A pressure line 53 leads from the cylinders of the residual steam compressor 51 to a pre-cooler and further to the condenser 36. The pressure line 53 is connected on the primary side. A line leads from the condenser 36 to a condensate pump and from there back into the steam generator 25.

Located at the bottom of the machine housing 44 of the swinging arm mechanism is a piston pump 54 with which the cold condensate is conducted with a line 37 to the secondary side of the condenser 36. The line leads from the condenser 36 back to the steam generator 25. The piston pump 54 is driven by the swinging arm mechanism via a pump lever 55, which swings in a bearing 56.

With start-up, an electric machine operates as motor, which drives the compressor 51, pressurizes the plant, expands the steam in the working cylinders 42 and thereby cools down the plant and thus brings it to operating temperature.

Figure 10:
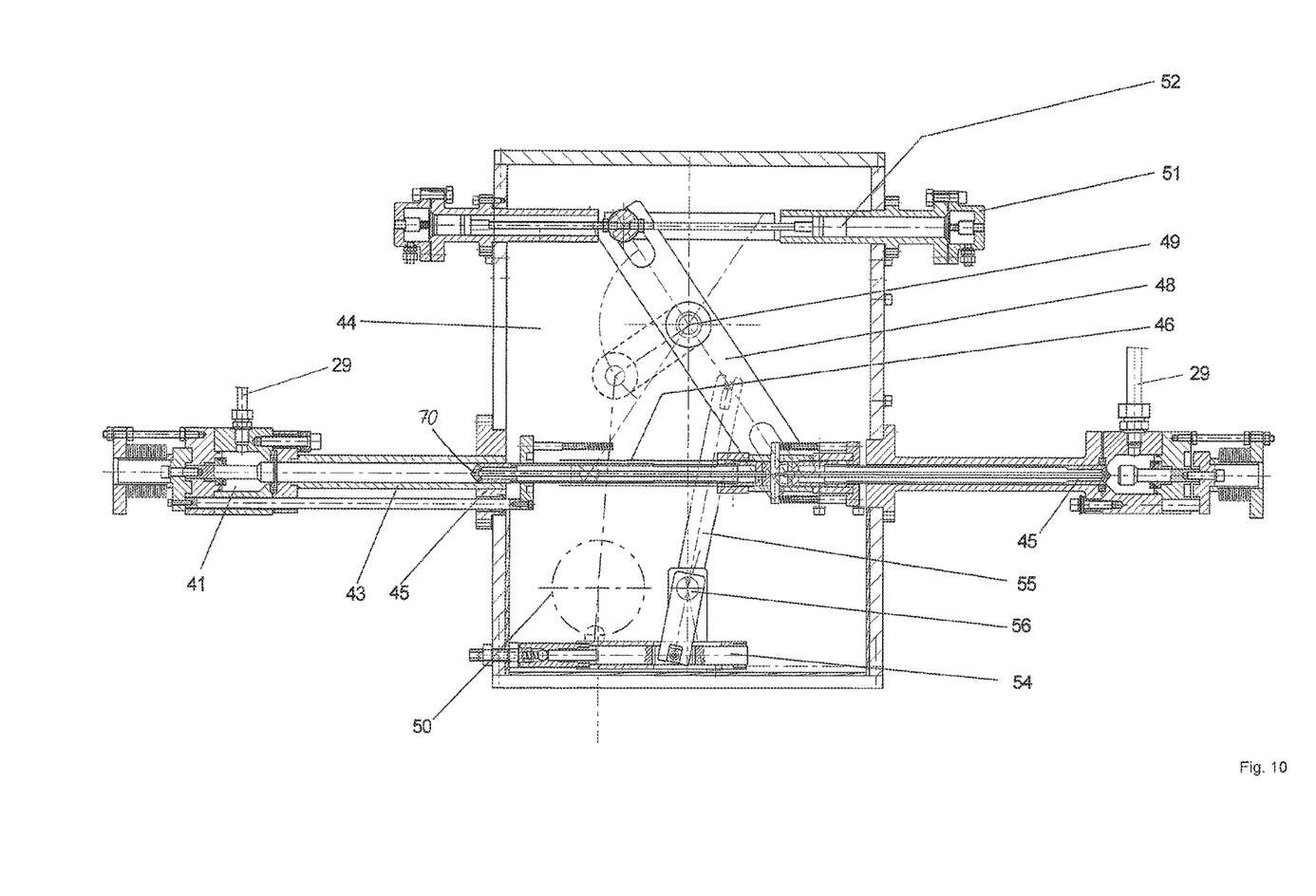
FIG. 10: A section through the condensation motor according to FIG. 9.

FIG. 10 shows a cross section through the swinging arm mechanism of the condensation motor, consisting of the machine housing 44, the working cylinders 43 and the pistons 45 of the expansion part of the condensation motor. With the swinging arm 48, which is coupled to the swinging arm shaft 49, the expansion work of the working medium is transmitted to the crank mechanism 50. Located at the top of the phase separator in the form of the machine housing 44 is the residual steam compressor 51. Located at the bottom of the phase separator is the piston pump 54, which is driven with the pump lever 55, which swings about the bearing 56 and transmits the necessary power output from the swinging arm 48 to the pistons 52 of the piston pump 54.

Figure 11:
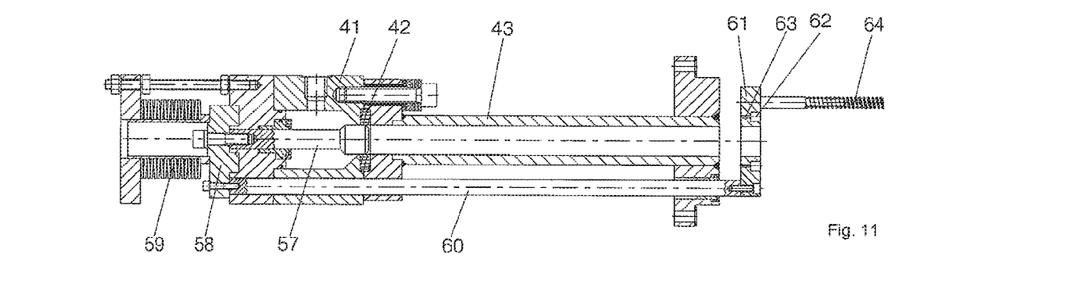
FIG. 11: A section through the working cylinder of the condensation motor according to FIG. 9.

FIG. 11 shows a cross section through the working cylinder 43 with the cylinder head 41, the cylinder head gasket 42, the high pressure chamber, in which the high-pressure steam is stored, the inlet valve 57, a valve bridge 58, in which the inlet valve 57 is screwed, a valve rod 60, damper disc 61 with an annular groove 62, a discharge bore 63 and a switching spring 64.

Figure 12:
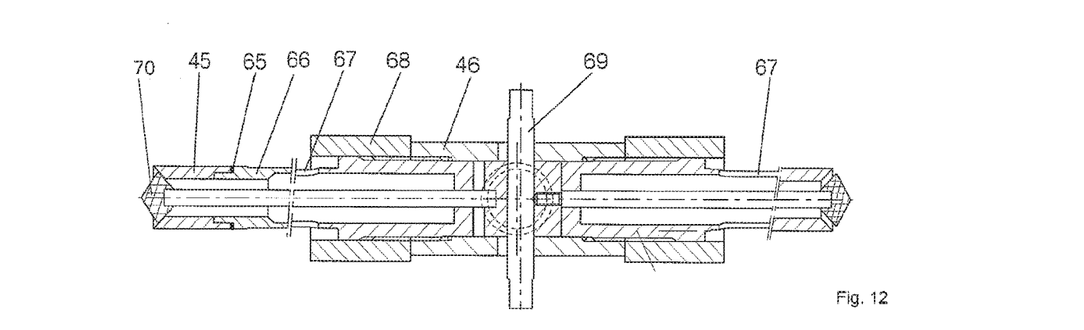
FIG. 12: A piston with outlet valve of the condensation motor according to FIG. 9.

FIG. 12 shows a cross section through the expansion piston 45 with a built-in outlet valve 70 with a valve cone and a centering ring 65, with a piston tube 66, exhaust port 67, an annular piston 68, the crosshead 46 and a switchover pin 69. The crosshead 46 is provided laterally with rollers, with which it is guided in the guiding piece 47. The centering ring 65 is of a material with good dry-running properties, such as, for example, PCTFE, so that frictional losses can be kept minimal. With the switchover pin 69 the outlet valve 70 can be switched in such a way that it is closed on the one side during expansion of the working medium, while it is open on the other side and the expanded steam can be expelled.

Figure 13:
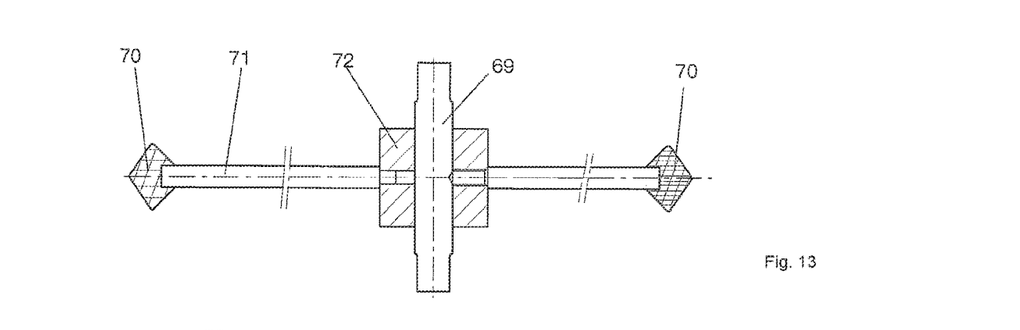
FIG. 13: An outlet valve according to FIG. 12.

FIG. 13 shows the outlet valve 70, built into the expansion piston 45, the valve consisting of the valve cone, the valve rod 71, a slider 72 and the switchover pin 69.

Figure 14:
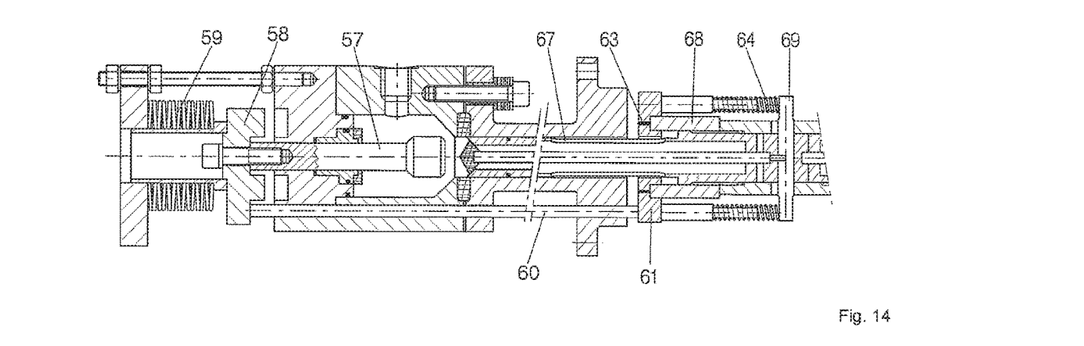
FIG. 14: A valve control of the thermal power plant according to FIG. 9.

FIG. 14 shows diagrammatically a control of inlet valve 57 and outlet valve 70. Toward the end of the outlet stroke, the switchover pin 69 of the piston 45 travels on the switching spring 64 and thereby closes the outlet valve 70. At the same time the annular piston 68 moves into the annular groove 63<sic. 62> of the damper disc 61 and compresses the enclosed steam. After the necessary pressure has been reached, the damper disc 61 is pushed against the cylinder flange and the inlet valve 57 is thereby opened. The discharge bore 62<sic. 63> is dimensioned in such a way that the enclosed steam flows away at the end of the filling process and the annular piston 68 rests in a close-fitting way on the bottom of the annular groove 63<sic. 62>. A defined spacing thereby results between inlet valve 57 and pistons 45 and thereby a defined filling volume.

Figure 15:
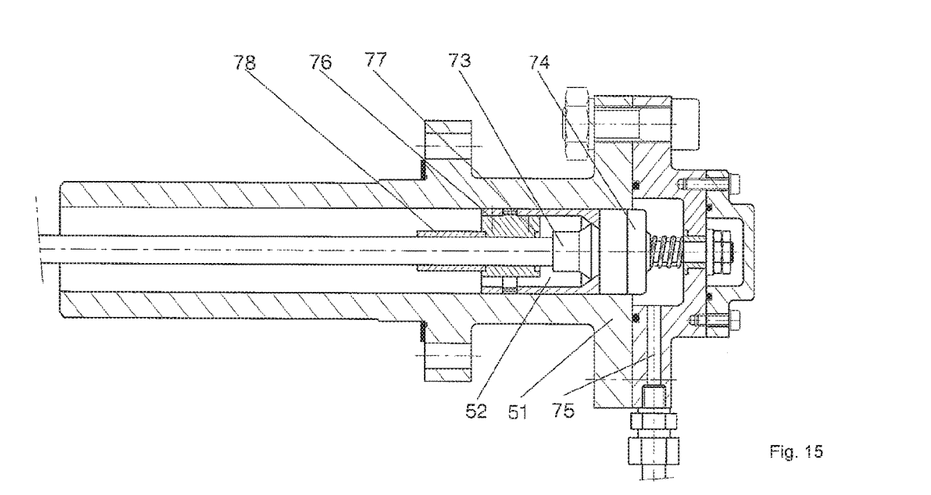
FIG. 15: A residual steam compressor of the thermal power plant according to FIG. 9.

FIG. 15 shows a cross section through the residual steam compressor 51 with pistons 52. Built into pistons 52 is an inlet valve 73 and opposite, built into the cylinder head, an outlet valve 74. Provided in the flange of the cylinder head is also a steam outlet 75. The inlet valve 73 is guided in a guide, such as e.g. a piston star 76, which is provided with a bevel shoulder 77 on both sides. The bevel shoulder 77 is adapted on the one hand to a shoulder of a cone of the inlet valve 73 and on the other hand to a damping sleeve 78.

Figure 16:
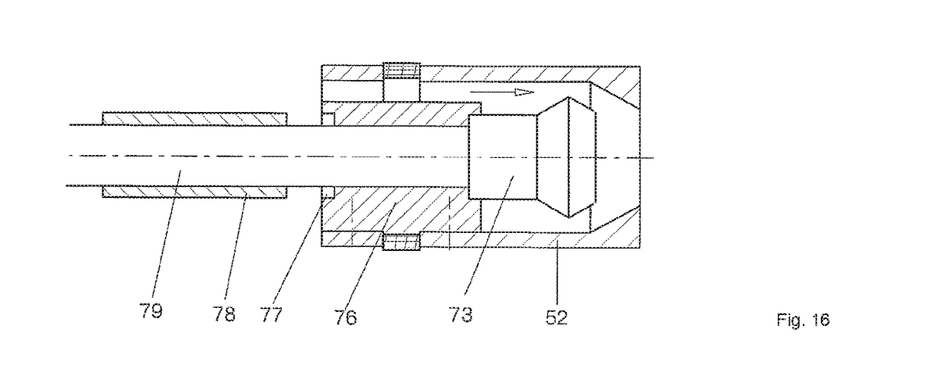
FIG. 16: A piston of a residual steam compressor of the thermal power plant according to FIG. 9.

FIG. 16 shows the piston 52 of the residual steam compressor 51 with opened inlet valve 73. Built into the piston 52 is the cone of the inlet valve 73, which is attached at the end of the piston rod 79. The piston rod 79 is guided with the piston star 76, and has on both sides one bevel shoulder 77 each. Installed on the piston rod 79 is the damping sleeve 78, which damps the impact during closing of the valve 73. The shoulder of the valve cone likewise moves into the opposite bevel shoulder and thereby damps the impact during opening of the inlet valve 73.

The operation of the thermal power plant according to the invention runs in the low temperature range. Therefore, with the selection of material for the components, special attention should be paid to the sliding problem in the case of the mechanical parts. Furthermore good heat insulation is helpful.

In the following the operating mode of the thermal power plant and of the energy conversion method according to the invention will be considered.

In a thermal power plant with condensation motor according to the invention, as shown in FIG. 9, a high-pressure steam is generated in the steam generator 25. For the working medium air, that is at a temperature between 132-160K and a pressure of 37-100 bar. With the heat input device 26 of the steam generator 25, the necessary heat energy is supplied from the heat source 27 with a suitable heat carrier. The generated high-pressure steam is led via the line 29 into the high pressure chambers of the cylinder heads 41, in which the high-pressure steam is fed into the stroke chambers by means of the inlet valve 57. The stroke is transmitted from the piston 45 through the piston rod to the crosshead 46, which transfers the force to the swinging arm 48 of the swinging arm mechanism. The crossheads 46 are guided in guiding pieces 47, so that no radial forces act on the piston. The crossheads 46 are guided on rollers so that the friction can be kept small. The swinging arm mechanism, which swings on the swinging arm shaft 49, transmits the work to the crank mechanism 50, with which, via a further mechanism, a generator is driven. Suitable as transmission is preferably an infinitely variable hydraulic transmission. A residual steam compressor 51 is also driven with the swinging arm 48. Likewise driven with the swinging arm 48 is the piston pump 54 via the pump lever 55, which swings about the bearing 56.

Through the expansion of the working medium there results a phase mixture of condensed portion, i.e. a condensate, and non-condensed portion, i.e. a steam portion. The machine housing 44 serves as phase separator, in that, e.g. by means of the principle of gravity, the condensed portion and the non-condensed portion are separated. The steam portion is sucked up and compressed above at the top of the machine housing 44 by the residual steam compressor 51. It is thereby to be observed that only 60% of the expanded steam has to be compressed again and that the intermolecular attraction facilitates the compression, as explained previously. This means that this influence is to be determined with the compressibility factor Z. The superheat and thus the energy balance of the process depend thereon.

The inlet valve 57 is controlled via the damper disc 61 of the valve rod 60, as shown in FIG. 11. When the damper disc 61 is pushed against the cylinder flange, this movement is transmitted via the valve rods 60 to the valve bridge 58, and the inlet valve 57, which is screwed to the valve bridge 58, is thereby opened. The inlet valve 57 is of cylindrical design, and moves like a piston some millimeters into the cylinder bore. The pressure is thereby limited by the closing spring 59, and pressure peaks, which can arise at the beginning of the stroke, can thereby be absorbed. The inlet valve 57 is closed again by means of the closing spring 59.

FIG. 12 shows the piston 45 with built-in outlet valve 70. Owing to the operation in low temperature range, lubrication is difficult. Thus contactless pistons 45 are provided for the condensation motor. This requires that the pistons 45 be fitted relatively precisely in the cylinder bore. With a gap width between cylinder bore and piston of 10 μm, a leak rate of max. 1%, with 20 μm, 6%, must be anticipated. Therefore supporting the crossheads 46 on rollers is foreseen, so that no radial forces act on the pistons 45. So that the pistons 45 really move in a contactless way, a centering ring 65 is provided that is made of a material having good dry-running properties. The front face of the piston 45 is designed as valve seat, on which the valve cone of the outlet valve 70 is installed. The valve cone is connected via the piston rod 71 to the slider 72, into which the switchover pin is built. With the switchover pin 69 the outlet valve 70 can be moved back and forth. The slider 72 has moreover the function of damping the impact of the outlet valve 70. The outlet valve 70 is engineered in such a way that it is closed with expansion stroke of the one piston and at the same time is open for the discharge at the opposite piston. The steam can flow away through the piston tube 66 and then through the exhaust port 67 into the machine housing 44, respectively the phase separator. Toward the end of the expansion stroke the switchover pin 69 moves against the switching spring 64, whereby the outlet valve 70 is switched.

FIG. 14 shows the control of inlet valve 57 and outlet valve 70 with opened inlet valve 57. Toward the end of the discharge stroke, the switchover pin 69 hits the switching spring 64 and thereby closes the outlet valve 70. Then the annular piston 68 drives into the annular groove 63<sic. 62> of the damper disc 61 and compresses the enclosed steam, whereby the impact is damped. At a pressure of 20-30 bar, the closing force at the inlet valve 57 is overcome and the valve is thereby opened. When the annular gap between the annular piston and the channel of the damper disc is very small, the outflow resistance becomes very great and thus a high pressure can be generated for a short time. During the filling process the air enclosed in the annular groove 63<sic. 62> flows away via the discharge bore 62<sic. 63>, so that the annular piston 68 rests in a close-fitting way on the bottom of the annular groove 63<sic. 62>, and a defined spacing and thus a defined fill quantity results between the inlet valve 57 and the piston 52.

Figure 17A:
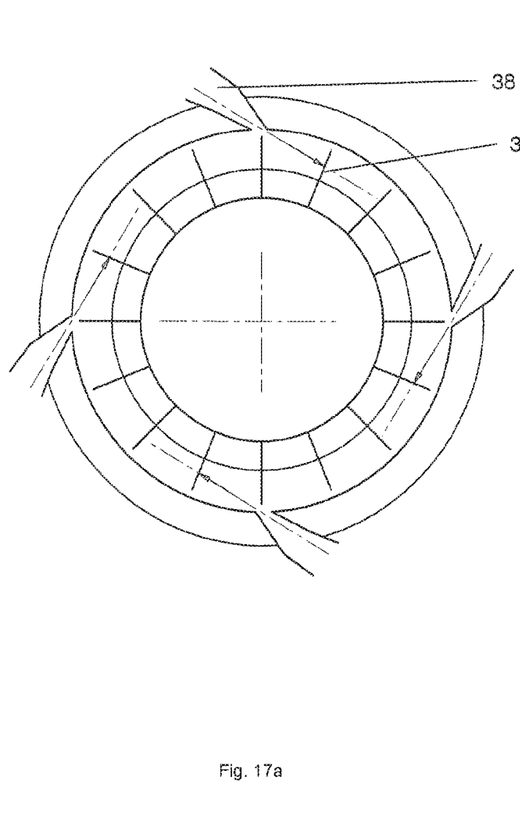
FIG. 17: A steam turbine for phase separation according to the centrifuge principle.
Figure 17B:
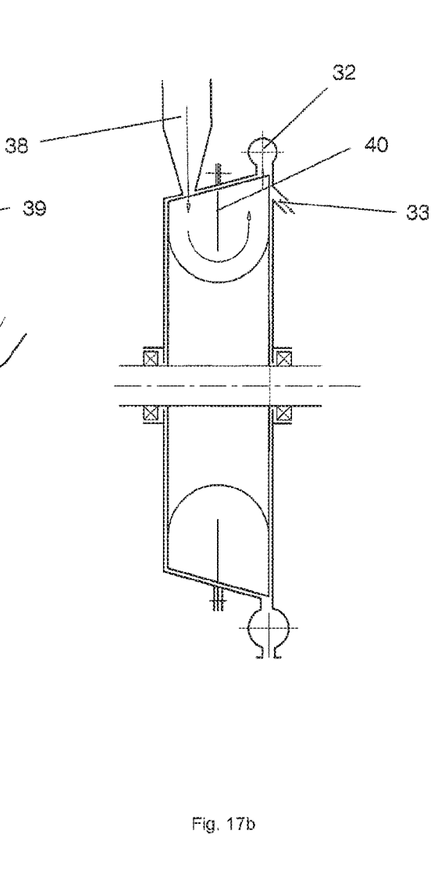

FIG. 17 shows a simplified schematic representation of a steam turbine, as can be used, for example, for the phase separation of the condensed portion and of the non-condensed portion. FIG. 17*a* shows a top view of four steam nozzles 38, through which the vaporized working medium can be introduced. Through the centrifugal force in the turbine the two portions are separated. The condensed portion exits at the condensate outlet 39. FIG. 17*b* shows a longitudinal section through the steam turbine and a steam nozzle 38. In the turbine the working medium is diverted around a plane 40. Residual steam is discharged via a residual steam suction line 33.

For the design of the thermal power plant with the working fluid air, the following data result: The compressor capacity is regulated in such a way that the pressure in the machine housing 44, i.e. the phase separator, amounts to approximately 1 bar, which corresponds to a temperature of 70 K. In the residual steam compressor 51 the residual steam is compressed to 33 bar, which results in a condensation temperature of 130 K. This heated residual steam is led into the primary side of the condenser 36, in which it is liquefied with cold condensate, which is delivered through the secondary side of the condenser 36. At 130 K there results for 0.62 kg steam a heat of condensation of 40.56 kJ. If 0.38 kg of condensate is heated from 70K to 129 K, 44.84 kJ heat can be discharged. The re-cooling of 60% steam with 40% condensate is possible because the specific heat of the condensate is about twice as high as that of the superheated steam. Thus the steam portion can be condensed internally.

The resulting condensate is then led back into the steam generator 25 by means of the piston pump 54, so that there is heat recovery.

An electric machine can serve as motor for the start-up. The residual steam compressor thereby acts as gas compressor and puts the working fluid under pressure. The plant is thereby controlled in such a way that in the machine housing 44, i.e. the phase separator, there is a pressure of about 1 bar and on the overpressure side at least 40 bar. That results in a pressure drop of 1:40 and, seen adiabatically, a cooling from 293 K to 73 K. The condensation motor can thereby be cooled down and brought to operating temperature. When the operating temperature is reached, condensation operation begins and the electric machine is changed to generator operation. At the start the compressed gas can be pre-cooled to 293 K with the pre-cooler.

LIST OF REFERENCE SYMBOLS 1 wet steam expansion
2 critical point
3 non-condensed portion
4 condensed portion
5 residual steam compression
6 re-cooling
7 residual steam condensation
8 pumping and heating of the condensed residual steam
9 pumping and heating of the cold condensate portion
10 vaporization
11 Maxwell distribution at the critical point
12 binding energy
13 quasi condensed molecules
14 non-condensable molecules 15 distribution curve according to Maxwell in the final state
16 condensable molecules in the final state
17 non-condensable molecules in the final state
18 compressibility factor Z
19 adiabatic curve for $p_A$=131 bar
20 adiabatic curve for $p_A$=37.2 bar
21 moving wall
22 median molecular velocity before impact
23 median molecular velocity after impact
24 doubled piston velocity
25 steam generator
26 heat input device
27 heat source
28 pump
29 high-pressure line
30
31
32 condensate connection
33 residual steam suction line
34 compressor
35 pre-cooler
36 condenser
37 condensate pump
38 steam nozzle
39 condensate outlet
40 plane
41 cylinder head
42 cylinder head gasket
43 working cylinder
44 machine housing/phase separator
45 piston
46 crosshead
47 guiding piece
48 swinging arm
49 swinging arm shaft
50 crank mechanism
51 residual steam compressor
52 piston
53 residual steam pressure line
54 piston pump
55 pump lever
56 pump lever bearing
57 inlet valve
58 valve bridge
59 closing spring
60 valve rod
61 damper disc
62 annular groove
64 switching spring
65 centering ring
66 piston tube
67 exhaust port
68 annular piston
69 switchover pin
70 outlet valve
71 valve rod
72 slider
73 inlet valve
74 outlet valve
75 residual steam outlet
76 piston star
77 bevel shoulder
78 damping sleeve
79 piston rod

The invention claimed is:

1. A thermal power plant for converting energy by means of a working medium, which has:
a steam generator (25) for vaporizing the working medium at a first pressure,
a steam expanding device for expanding the working medium present in the vapor state to a lower, second pressure,
a condenser (36), which cools and liquefies the working medium let out of the steam expanding device, and
a condensate pump (37), characterized in that
the steam expanding device is designed in such a way that a working medium expanded by the steam expanding device has a condensed portion and a non-condensed portion, wherein the steam expanding device comprises working cylinders (43), wherein the cylinders include inlet valves (57) for admitting the vaporized working medium, and pistons (45), and whereby the working cylinders comprise two working cylinders (43) disposed opposite one another and connected to one another by the pistons,
a separation device for separation of the condensed portion and the non-condensed portion and a compressor (51) for compression (5) of the non-condensed portion of the working medium are provided,
whereby the non-condensed portion of the expanded working medium condenses at least partially through the condensed portion in the condenser (36).

2. The thermal power plant according to claim 1, characterized in that the separation device comprises a housing (44), whereby provided in an upper region of the housing (44) is the compressor (51), in a lower region of the housing (44) is the steam expanding device and in a bottom region under the lower region is a pump (54) for pumping out the one condensed portion.

3. The thermal power plant according to claim 1, characterized in that a swinging arm mechanism with at least one swinging arm (48) is provided, which mechanism is coupled to the compressor (51) for compression (5) of the non-condensed portion of the working medium and to a pump (54) for discharging the condensed portion (4) out of the separation device.

4. The thermal power plant according to claim 3, characterized in that the working cylinders (43) and pistons (45) are driven by the swinging arm mechanism.

5. The thermal power plant according to claim 4, characterized in that a swinging arm (48) of the swinging arm mechanism transmits expansion work of the working medium from the working cylinders to a crank mechanism (50).

6. The thermal power plant according to claim 1, characterized in that useable heat sources (27) include heat from combustion, geothermal energy, solar systems, waste heat from cooling systems and/or from heat recovery.

7. The thermal power plant according to claim 1, characterized in that the pistons (45) have outlet valves (70), which are built into the piston (45) and are controllable by a switchover pin (69).

8. The thermal power plant according to claim 1, characterized in that the compressor (51) comprises compressor inlet valves (73) and compressor pistons (52), whereby a compressor inlet valve (73) is disposed in the compressor piston (52) and is controllable by means of a piston rod (79).

9. An energy conversion method for converting heat into mechanical or electrical energy by means of a working medium, which has the following steps:
a) Generating a steam state working medium at a first pressure in a steam generator, b) Admitting the working medium to working cylinders of a steam expanding device via inlet valves,
c) Expanding (1) the steam state working medium at a lower, second pressure in the steam expanding device using working cylinders and pistons,
d) Discharging an energy obtained by the expansion, characterized in that
    e) the expansion (1) of the steam state working medium proceeds through a polytrope of the working medium, the working medium being separated in a separation device (44) into a non-condensed portion (3) and a condensed portion (4),
    f) compression (5) of the non-condensed portion (3) in a compressor (51) into a compressed, non-condensed portion (3),
    g) cooling (6) and condensing (7) of the compressed, non-condensed portion (3) into a compressed condensed portion (3'),
    h) heating (8; 9) of the compressed condensed portion (3') and the condensed portion (4) and return of the portions (3', 4) to the steam generator.

10. The energy conversion method according to claim 9, characterized in that the expansion (1) of the steam state working medium proceeds through a saturation line of the working medium.

11. The energy conversion method according to claim 9, characterized in that the expansion (1) takes place through a wet steam expansion.

12. The energy conversion method according to claim 9, characterized in that the cooling (6) and condensing (7) of the compressed, non-condensed portion (3') is realized by means of the condensed portion (4).

13. The energy conversion method according to claim 9, characterized in that the second pressure is determined by a compressibility factor Z for the working medium at the critical point.

14. The energy conversion method according to claim 9, characterized in that the non-condensed portion (3) amounts to 50% to 60% of the steam state working medium.

15. The energy conversion method according to claim 9, characterized in that a first part of the work performed in the steam expanding device by the working medium is discharged to a generator and a second part of the work performed in the steam expanding device by the working medium is discharged to the compressor, in order to compress and heat the non-condensed portion.

16. The energy conversion method according to claim 9, characterized in that the expansion (1) of the steam state working medium proceeds through a critical point (2) of the working medium.

* * * * *